(12) United States Patent  
Arimilli et al.

(10) Patent No.: US 8,893,126 B2  
(45) Date of Patent: Nov. 18, 2014

(54) BINDING A PROCESS TO A SPECIAL PURPOSE PROCESSING ELEMENT HAVING CHARACTERISTICS OF A PROCESSOR

(75) Inventors: Lakshminarayana B. Arimilli, Austin, TX (US); Ravi K. Arimilli, Austin, TX (US); Guy L. Guthrie, Austin, TX (US); Charles F. Marino, Round Rock, TX (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1800 days.

(21) Appl. No.: 12/024,220

(22) Filed: Feb. 1, 2008

(65) Prior Publication Data

US 2009/0198971 A1  Aug. 6, 2009

(51) Int. Cl.
*G06F 9/00* (2006.01)
*G06F 13/12* (2006.01)

(52) U.S. Cl.
CPC ........................ *G06F 13/12* (2013.01)
USPC ............................... 718/100; 712/34

(58) Field of Classification Search
CPC .................. G06F 13/12; G06F 2213/0026
USPC .......... 712/1, 34, 244; 718/100; 710/300, 313; 711/202
See application file for complete search history.

(56) References Cited

U.S. PATENT DOCUMENTS

| | | | |
|---|---|---|---|
| 4,204,113 A | 5/1980 | Giraud et al. | |
| 5,016,169 A | 5/1991 | Koya et al. | |
| 5,420,809 A * | 5/1995 | Read et al. | 708/200 |
| 5,603,047 A * | 2/1997 | Caulk, Jr. | 712/23 |
| 5,706,434 A | 1/1998 | Kremen et al. | |
| 5,742,840 A * | 4/1998 | Hansen et al. | 712/210 |
| 5,918,229 A | 6/1999 | Davis et al. | |
| 6,314,501 B1 * | 11/2001 | Gulick et al. | 711/153 |
| 6,446,185 B2 | 9/2002 | Hagersten | |
| 6,475,162 B1 * | 11/2002 | Hu | 600/558 |
| 6,513,057 B1 * | 1/2003 | McCrory | 718/102 |
| 6,574,721 B1 | 6/2003 | Christenson et al. | |
| 6,668,299 B1 | 12/2003 | Kagan et al. | |
| 6,738,889 B2 | 5/2004 | Godtland et al. | |
| 6,952,722 B1 | 10/2005 | Podila et al. | |

(Continued)

FOREIGN PATENT DOCUMENTS

WO    WO 98/32077    7/1998

OTHER PUBLICATIONS

U.S. Appl. No. 11/958,668.
U.S. Appl. No. 12/024,695.

(Continued)

*Primary Examiner* — David J Huisman
(74) *Attorney, Agent, or Firm* — Stephen R. Tkacs; Stephen J. Walder, Jr.; William J. Stock (57) ABSTRACT

A heterogeneous processing element model is provided where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model puts special purpose processing elements on the same playing field as processors, from a programming perspective, operating system perspective, and power perspective. The operating system can get work to a security engine, for example, in the same way it does to a processor.

20 Claims, 4 Drawing Sheets

(56) References Cited

U.S. PATENT DOCUMENTS

| | | |
|---|---|---|
| 7,149,873 B2 | 12/2006 | Mohideen et al. |
| 7,213,081 B2 | 5/2007 | Narasimhamurthy et al. |
| 7,447,867 B2 | 11/2008 | Soja et al. |
| 7,509,391 B1 * | 3/2009 | Chauvel et al. ............... 709/214 |
| 7,533,238 B2 | 5/2009 | Burns et al. |
| 7,552,269 B2 * | 6/2009 | Thurber et al. ............... 710/313 |
| 7,895,407 B2 * | 2/2011 | Dankel et al. ................. 711/170 |
| 8,031,198 B1 * | 10/2011 | Smith et al. .................... 345/501 |
| 2001/0027512 A1 | 10/2001 | Hagersten |
| 2002/0032844 A1 | 3/2002 | West |
| 2004/0098447 A1 | 5/2004 | Verbeke et al. |
| 2005/0149903 A1 | 7/2005 | Archambault et al. |
| 2006/0139360 A1 * | 6/2006 | Panesar et al. ................ 345/568 |
| 2007/0033592 A1 | 2/2007 | Roediger et al. |
| 2008/0055321 A1 * | 3/2008 | Koduri .......................... 345/505 |
| 2009/0153897 A1 | 6/2009 | Blackmore et al. |
| 2009/0157996 A1 | 6/2009 | Arimilli et al. |
| 2009/0198837 A1 | 8/2009 | Arimilli et al. |

OTHER PUBLICATIONS

U.S. Appl. No. 11/958,956.

* cited by examiner

BINDING A PROCESS TO A SPECIAL PURPOSE PROCESSING ELEMENT HAVING CHARACTERISTICS OF A PROCESSOR

This invention was made with United States Government support under Agreement No. HR0011-07-9-0002 awarded by DARPA. THE GOVERNMENT HAS CERTAIN RIGHTS IN THE INVENTION.

BACKGROUND

1. Technical Field

The present application relates generally to an improved data processing system and method. More specifically, the present application is directed to heterogeneous processing elements.

2. Description of Related Art

Figure 1:
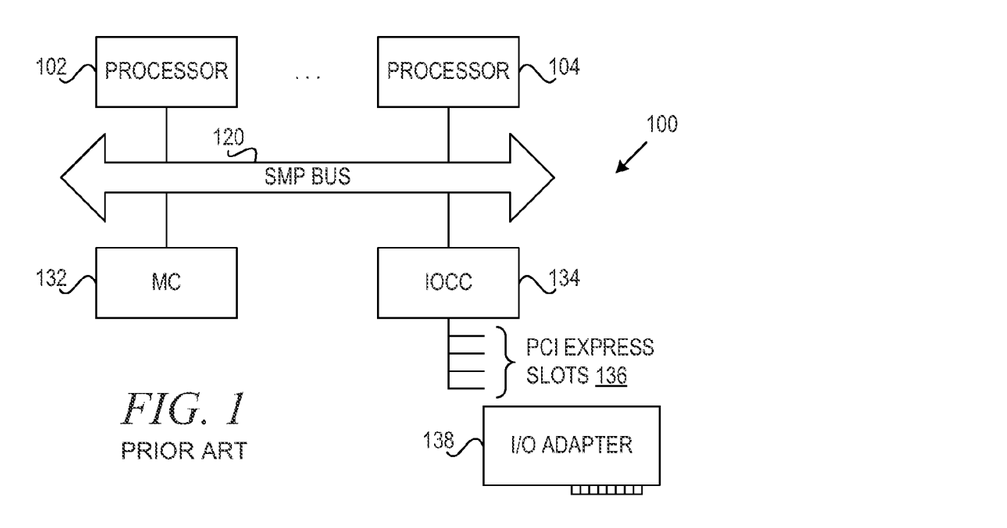
FIG. 1 is a block diagram illustrating a typical multiple processor data processing system.

Input/output, or I/O, refers to the transfer of data between a processor and a peripheral device in a data processing system. Every transfer is an output from one device and an input to another device. FIG. 1 is a block diagram illustrating a typical multiple processor data processing system. In the depicted example, data processing system 100 has a plurality of processors 102, 104 connected via a symmetric multiprocessing (SMP) bus 120. Memory controller (MC) 132 and input/output channel controller (IOCC) 134 also connect to SMP bus 120

In the example shown in FIG. 1, IOCC 134 connects to a plurality of expansion slots, such as peripheral component interconnect express (PCI Express or PCIe) slots 136. One or more I/O adapter 138 may connect to PCI Express slots 136.

Figure 2:
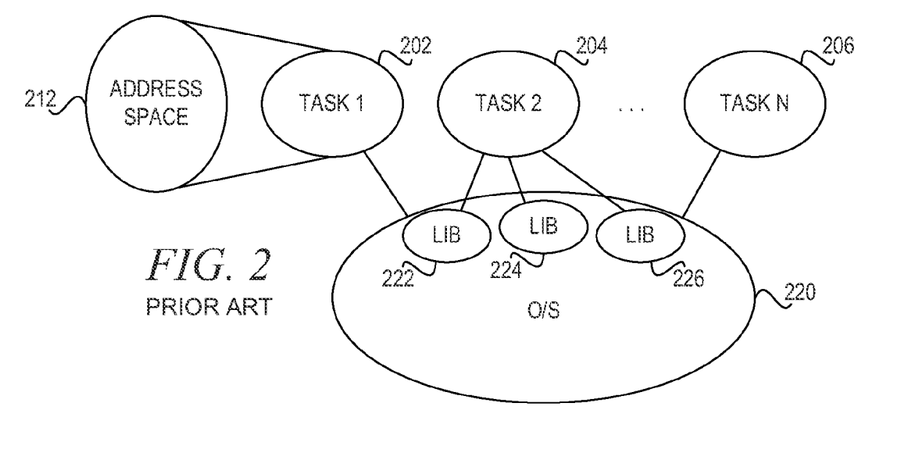
FIG. 2 illustrates a typical software environment for a data processing system.

FIG. 2 illustrates a typical software environment for a data processing system, such as data processing system 100 in FIG. 1. A plurality of tasks 1-N 202, 204, 206 run under control of operating system 220. A task 202, 204, 206 may be a process running on a processor, for example. Each task has an assigned address space. For example, operating system 220 assigns task 1 202 an address space 212 that comprises a range of effective addresses, which may also be referred to as virtual addresses. Each task 202, 204, 206 has an address space, or address space, from which and to which it may read and write. The operating system 220 translates the effective addresses to real addresses, which may exist in memory or may be expanded to persistent storage using a virtual memory manager.

Each time a task, such as task 2 204, attempts to access an I/O device, such as I/O adapter 138 in FIG. 1, task 204 must make a call to one of libraries 222, 224, 226. There are three main categories of I/O, including classic I/O, storage, and network I/O. Thus, these libraries may include a classic I/O library, a storage library, and a network library, for example. For instance, task 2 204 may access, or "touch," an I/O adapter by making a call to library 222. Each library may include sub-calls. For example, the network I/O library, such as library 222, may include transmission control protocol/Internet protocol (TCP/IP) calls, user datagram protocol/Internet protocol (UDP/IP) calls, etc.

Figure 3:
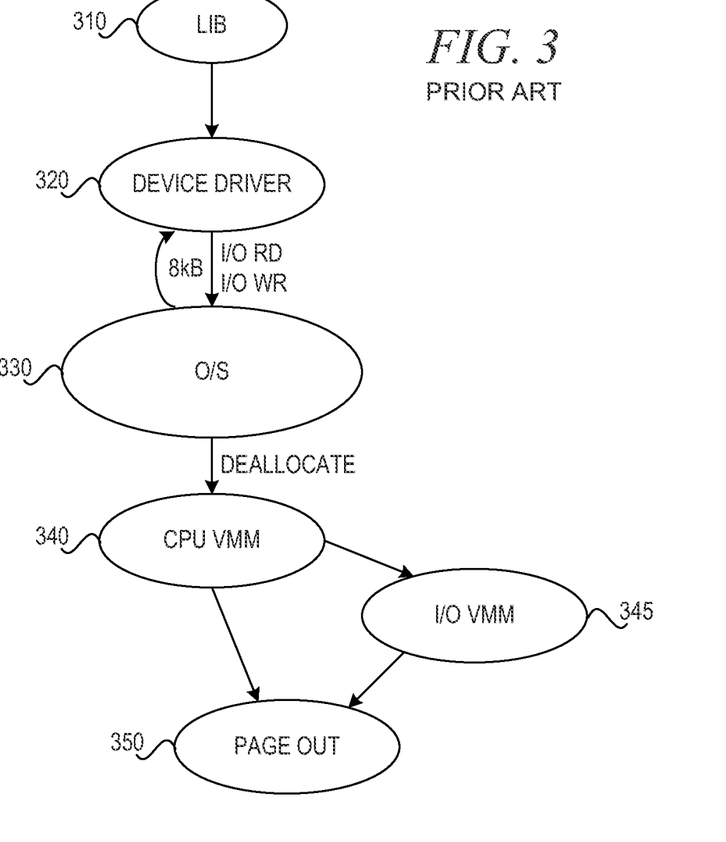
FIG. 3 illustrates a typical input/output access.

FIG. 3 illustrates a typical input/output access. A task makes a call to library 310, which accesses device driver 320 for the target I/O device. Device driver 320 then performs I/O reads (RD) and I/O writes (WR) to set up the device. Then, device driver 320 requests an amount of memory, such as 8 kB, from operating system (O/S) 330 to be "pinned" so device driver 320 can read and write into physical memory. O/S 330 then communicates with the central processing unit (CPU) virtual memory manager (VMM) 340 to deallocate the requested amount of memory. The CPU VMM 340 assigns an effective address range to the I/O VMM 345, and the CPU VMM 340 and I/O VMM 345 perform a page out operation 350 to pin the memory to the I/O device.

This typical process is based on a model that has existed for a very long time. Processes running on processors are at the top of the hierarchy, while I/O devices are at the bottom of the hierarchy. Manufacturers of I/O devices accept that I/O devices are second-class citizens, and that a process must go through the conventional process of setting up an I/O device through an O/S library and a device driver to perform I/O reads and writes.

As current trends continue, network I/O and storage I/O in particular are becoming more important than the processing elements. Yet, the model for setting up an I/O device and performing I/O reads and writes remains the same. The existing model is pervasive in the world today, and manufacturers are left to accept their lot in life.

SUMMARY

In one illustrative embodiment, a method, in a data processing system, binds a process to a heterogeneous processing element. The method comprises assigning an effective address range to a special purpose processing element within a plurality of heterogeneous processing elements. The plurality of heterogeneous processing elements comprises a processor in a processor slot and the special purpose processing element connected to an input/output channel controller. The method comprises binding a process to the special purpose processing element. The method further comprises executing the process on the special purpose processing element.

In another illustrative embodiment, a data processing system comprises a plurality of heterogeneous processing elements. The plurality of heterogeneous processing elements comprise a processor in a processor slot and a special purpose processing element that is connected to an input/output channel controller. The data processing system further comprises a memory coupled to the plurality of heterogeneous processing elements via a bus, the memory operable to store an operating system. The operating system runs on at least one of the plurality of heterogeneous processing elements. The operating system assigns an effective address range to the special purpose processing element, binds a process to the special purpose processing element, and initiates execution of the process on the special purpose processing element.

In another illustrative embodiment, a computer program product comprises a computer useable medium having a computer readable program. The computer readable program, when executed on a computing device, causes the computing device to assign an effective address range to a special purpose processing element within a plurality of heterogeneous processing elements. The plurality of heterogeneous processing elements comprise a processor in a processor slot and the special purpose processing element connected to an input/output channel controller. The computer readable program further causes the computing device to bind a process to the special purpose processing element and initiate execution of the process on the special purpose processing element.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 4:
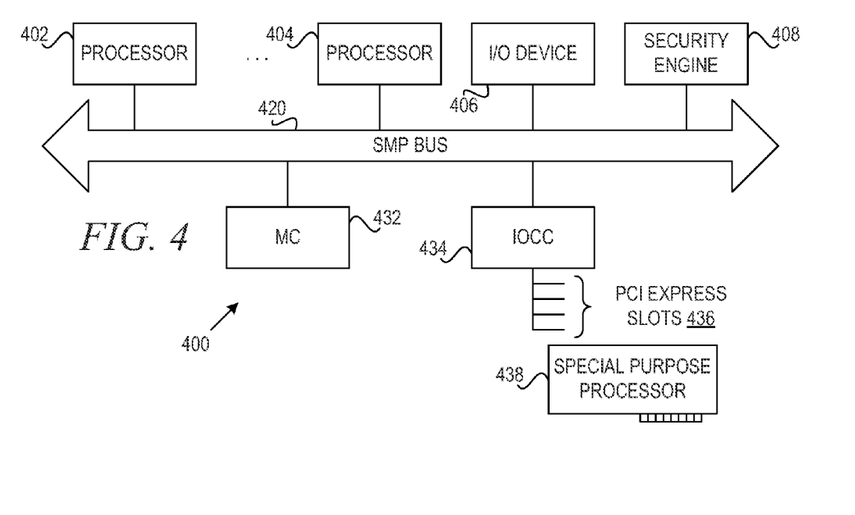
FIG. 4 is a block diagram of an exemplary data processing system in which aspects of the illustrative embodiments may be implemented.

With reference now to the figures and in particular with reference to FIG. 4, an exemplary diagram of data processing environments is provided in which illustrative embodiments of the present invention may be implemented. It should be appreciated that FIG. 4 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 4, a block diagram of an exemplary data processing system is shown in which aspects of the illustrative embodiments may be implemented. Data processing system 400 is an example of a computer. In the depicted example, data processing system 400 has a plurality of processors 402, 404 connected via a symmetric multiprocessing (SMP) bus 420. Memory controller (MC) 432 and input/output channel controller (IOCC) 434 also connect to SMP bus 420.

An operating system may run on processing units 402, 404. The operating system coordinates and provides control of various components within the data processing system 400 in FIG. 4. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 400 (Java is a trademark of Sun Microsystems, Inc. in the United States, other countries, or both).

As a server, data processing system 400 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 400 may be a symmetric multiprocessor (SMP) system including a plurality of processors in processing units 402, 404. Alternatively, a single processor system may be employed.

Instructions for the operating system, the object-oriented programming system, and applications or programs are located on storage devices, such as a hard disk drive, and may be loaded into main memory through memory controller 432 for execution by processing units 402, 404. The processes for illustrative embodiments of the present invention may be performed by processing units 402, 404 using computer usable program code, which may be located in a memory such as main memory (not shown), or in one or more peripheral devices, for example.

A bus system, such as SMP bus 420 as shown in FIG. 4, may be comprised of one or more buses. Of course, the bus system may be implemented using any type of communication fabric or architecture that provides for a transfer of data between different components or devices attached to the fabric or architecture. Those of ordinary skill in the art will appreciate that the hardware in FIG. 4 may vary depending on the implementation. Other internal hardware or peripheral devices, such as flash memory, equivalent non-volatile memory, or optical disk drives and the like, may be used in addition to or in place of the hardware depicted in FIG. 4.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device which is configured with flash memory to provide non-volatile memory for storing operating system files and/or user-generated data, for example. Essentially, data processing system 400 may be any known or later developed data processing system without architectural limitation.

In a typical software environment, a plurality of tasks runs under control of an operating system. A task may be a process running on a processor, such as a user level thread, for example. Each task has an assigned address space. Each task has an address space, or address space, from which and to which it may read and write. The operating system translates the effective addresses to real addresses, which may exist in memory or may be expanded to persistent storage using a virtual memory manager. A user level thread communicates with another user level thread by making an access request to an effective address.

Each time a task attempts to access an I/O device, the task must make a call to a library, which accesses the device driver for the target I/O device. The device driver then performs I/O reads and writes to set up the device. Then, the device driver requests an amount of memory, such as 8 kB, from the operating system to be "pinned" so the device can read and write into physical memory. This typical process is based on a model that has existed for a very long time. Processes running on processors are at the top of the hierarchy, while I/O devices are at the bottom of the hierarchy. Manufacturers of I/O devices accept that I/O devices are second-class citizens, and that a process must go through the conventional process of setting up an I/O device through an O/S library and a device driver to perform I/O reads and writes. As current trends continue, network I/O and storage I/O in particular are becoming more important than the processing elements. Yet, the model for setting up an I/O device and performing I/O reads and writes remains the same. The existing model is pervasive in the world today, and manufacturers are left to accept their lot in life.

In accordance with an illustrative embodiment, a heterogeneous processing element model is provided where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model puts special purpose processing elements on the same playing field as processors, from a programming perspective, operating system perspective, and power perspective. The operating system can get work to a security engine, for example, in the same way it does to a processor.

In the illustrative embodiment, IOCC 434 connects to a plurality of expansion slots, such as peripheral component interconnect express (PCI Express or PCIe) slots 436. One or more special purpose processors 438 may connect to PCI Express slots 436. In the depicted example, special purpose processor 438 may be, for example, an I/O device, such as a local area network (LAN) adapter, a storage controller, a security engine, or the like. Thus, a heterogeneous processing element model is provided where I/O devices and other special purpose processing elements look and act like processors. In order to be treated like a processor, a special purpose processing element must follow some rules and have some characteristics of a processor, such as address translation, security, interrupt handling, and exception processing, for example.

Alternatively, in accordance with the illustrative embodiment, a special purpose processing element may connect to SMP bus 120 via a processor slot (not shown). Thus, I/O device 406 and security engine 408, for example, may look and act like a processor to the operating system, as long as I/O device 406 and security engine 408 obey the rules of a processor. The heterogeneous processing element model puts special purpose processing elements, such as I/O device 406, security engine 408, and special purpose processor 438, on the same playing field as processors, from a programming perspective, operating system perspective, and power perspective.

This heterogeneous processing element model eliminates the need for a device driver for I/O devices, for instance. Each processing element is assigned an address space from which and to which it may read and write. The operating system may then bind a process to a processing element, whether the processing element is a conventional single core processor, a multiple core processor, an I/O adapter, a security engine, or some other type of processing element. Some processing elements will be better at certain types of work than others. For example, a security engine will be better at a cryptography task than a conventional processor.

When the operating system initializes a process, the operating system assigns the process to a processor. In the heterogeneous processing element model described herein, a processor may be any one of a plurality of heterogeneous processing elements. Thus, the operating system may assign a task to an I/O adapter, for example, and assign an effective address range to the process.

Figure 5:
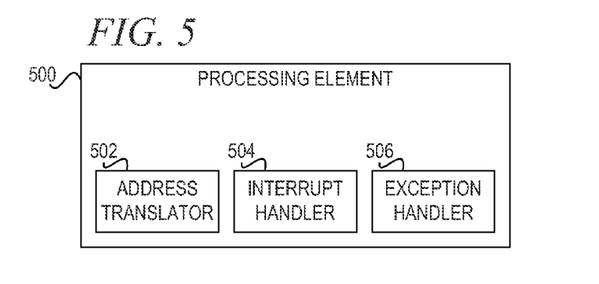
FIG. 5 is a block diagram of a processing element in accordance with an illustrative embodiment.

FIG. 5 is a block diagram of a processing element in accordance with an illustrative embodiment. As stated above, in order to be treated like a processor, a processing element must behave like a processor, meaning it must follow some rules and have some characteristics of a processor, such as address translation, security, interrupt handling, and exception processing, for example. Processing element 500 may be, for example, an I/O device, a security engine, a graphics processor, etc. Processing element 500 includes an address translator 502 to translate between effective addresses and real addresses.

In one exemplary embodiment, address translator 502 may be an effective-to-real address translation (ERAT) table. Known processor architectures specify a translation-lookaside buffer (TLB) and a segment-lookaside buffer (SLB) to translate from the effective address (EA) used by software and the real address (RA) used by hardware to locate instructions and data in storage. Since these translation mechanisms take several cycles, once translated, the EA, RA pair is stored in a two-way set-associative array, called the effective-to-real address translation (ERAT) table. For example, the POWER4™ architecture from IBM Corporation implements separate ERATs for instruction-cache (IERAT) and data-cache (DERAT) accesses. Both ERATs are indexed using the effective address. A common 1024-entry four-way set-associative TLB is implemented for each processor. Thus, in the exemplary embodiment, address translator 502 of processing element 500 may be a similar ERAT table to allow the processing element to easily translate between the effective address used by software and the real address used by hardware.

Processing element 500 also includes an interrupt handler 504. An interrupt is a signal that gets the attention of a processor and is usually generated when I/O is required. For example, hardware interrupts are generated when a key is pressed or when the mouse is moved. Software interrupts are generated by a program requiring disk input or output. As another example, an internal timer may continually interrupt the computer several times per second to keep the time of day current or for timesharing purposes. When an interrupt occurs, processing element 500 transfers control to the operating system, which determines the action to be taken. Thus, in order to be treated like a processor, a special purpose processing element, such as processing element 500, must have an interrupt handler 504 to take appropriate action when hardware or software requires the attention of processing element 500.

Processing element 500 also includes exception handler 506. Exception handling is a programming language construct or computer hardware mechanism designed to handle the occurrence of some condition that changes the normal flow of execution. The condition is called an exception. Exceptions are normally recommended to be used only for signaling error (exceptional) conditions. In general, current state will be saved in a predefined location and execution will switch to a predefined handler. Depending on the situation, the handler may later resume the execution at the original location, using the saved information to restore the original state. For example, an exception that will usually be resumed is a page fault, while a division by zero usually cannot be resolved transparently. From the processing point of view, hardware interrupts are similar to resumable exceptions, although they are usually not related to the current program flow. Thus, processing element 500 includes exception handler 506 to manage exception conditions that may change the normal flow of execution.

Thus, processing element 500 includes the necessary characteristics in order to be treated like a processor with respect to the operating environment of the data processing system. Whether processing element 500 exists in an expansion slot, such as PCI Express slots 436 in FIG. 4, or a processor slot, processing element 500 is treated like a processor by the operating system. In addition, processing element 500 must obey certain rules that processors must obey, particularly rules about security, for example. The operating system may then assign an address space from which and to which processing element 500 may read and write. The operating system may bind a process to processing element 500. Furthermore, other tasks may touch I/O, for instance, without the need for libraries and device drivers.

Figure 6:
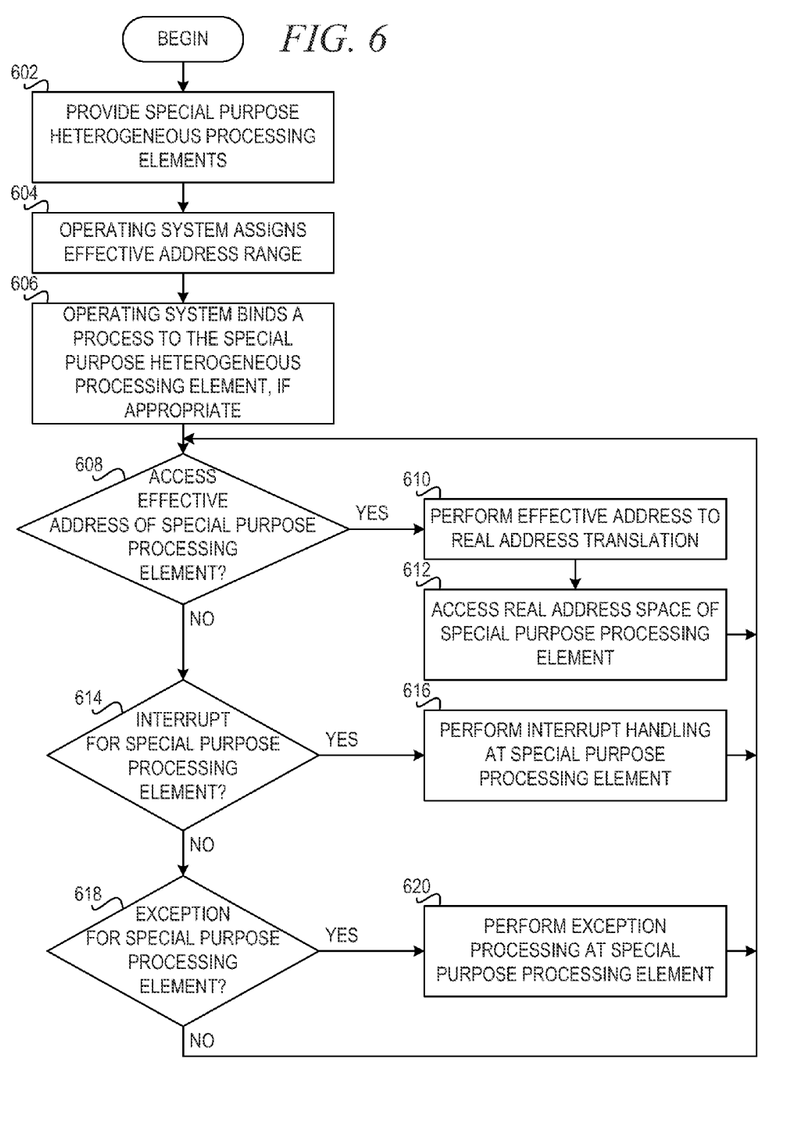
FIG. 6 is a flowchart illustrating operation of a processing element within a heterogeneous processing element model in accordance with an illustrative embodiment.

FIG. 6 is a flowchart illustrating operation of a processing element within a heterogeneous processing element model in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference now to FIG. 6, operation begins, and an operator provides a special purpose heterogeneous processing element in an I/O slot or a processor slot (block 602). In operation, the operating system assigns an effective address range to the processing element (block 604). The operating system may then bind a process to the special purpose heterogeneous processing element, if appropriate, treating a conventional processor or a special purpose processing element equally (block 606). That is, a special purpose processing element, such as an I/O device that complies with the heterogeneous processing element model of the illustrative embodiments described herein, may have an assigned effective address range and may have one or more processes bound to it. If the special purpose processing element can perform a task, such as moving data over a network, better than a conventional processor, then the data processing system will realize a significant improvement in effectiveness.

The operating system determines whether a process performs a data access to an effective address of the special purpose processing element (block 608). If a process attempts to access an effective address within the address space of the special purpose processing element, the special purpose processing element performs effective address to real address translation (block 610). The process then accesses the real address space of the special purpose processing element (block 612), without requiring a library call or a device driver. Thereafter, operation returns to block 608 to determine whether a process performs a data access to an effective address of the special purpose processing element.

If a process does not attempt to access the address space of the special purpose processing element in block 608, the special purpose processing element determines whether an interrupt for the special purpose processing element occurs (block 614). If there is an interrupt for the special purpose processor, the special purpose processor performs interrupt handling (block 616). When an interrupt occurs, the special purpose processing element transfers control to the operating system or an exception handler within the special purpose processor, which determines the action to be taken. Thereafter, operation returns to block 608 to determine whether a process performs a data access to an effective address of the special purpose processing element.

If there is not an interrupt for the special purpose processing element in block 614, the special purpose processing element determines whether there is an exception for the special purpose processing element (block 618). If there is an exception for the special purpose processing element, the special purpose processing element performs exception processing (block 620). The special purpose processing element may save current state in a predefined location and switch execution to a predefined handler. Depending on the situation, the handler may later resume execution at the original location, using the saved information to restore the original state. Thereafter, operation returns to block 608 to determine whether a process performs a data access to an effective address of the special purpose processing element.

Thus, the illustrative embodiments solve the disadvantages of the prior art by providing a heterogeneous processing element model where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model puts special purpose processing elements on the same playing field as processors, from a programming perspective, operating system perspective, and power perspective. The operating system can get work to a security engine, for example, in the same way it does to a processor.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for binding a process to a heterogeneous processing element, the method comprising:
    assigning, by an operating system executing on a processor of the data processing system, an effective address range to a special purpose processing element within a plurality of heterogeneous processing elements, wherein the plurality of heterogeneous processing elements comprise the processor connected to a system bus via a processor slot and the special purpose processing element connected to an expansion slot, wherein the expansion slot is connected to the system bus via an input/output channel controller, and wherein the special purpose processing element comprises an interrupt handler, an exception handler, and an address translator;
    binding, by the operating system, the process to the special purpose processing element;
    executing the process on the special purpose processing element;
    responsive to an interrupt for the special purpose processing element, performing interrupt handling within the special purpose processing element;
    responsive to an exception for the special purpose processing element, performing exception processing within the special purpose processing element; and
    responsive to the process accessing an effective address within the effective address range of the special purpose processing element, performing address translation within the special purpose processing element to access a real address in hardware.

2. The method of claim 1, wherein the address translator comprises an effective to real address translation (ERAT) table.

3. The method of claim 1, wherein the special purpose processing element adheres to a set of rules required for a processor.

4. The method of claim 1, wherein the expansion slot is a peripheral component interconnect express (PCIe) expansion slot.

5. The method of claim 1, wherein a peripheral device is connected to a second expansion slot and wherein the second expansion slot is connected to the system bus via the input/output channel controller.

6. The method of claim 1, wherein the special purpose processing element is an input/output adapter.

7. The method of claim 1, wherein the special purpose processing element is a security processor.

8. A data processing system, comprising:
    a plurality of heterogeneous processing elements, wherein the plurality of heterogeneous processing elements comprise a processor connected to a system bus via a processor slot and a special purpose processing element connected to an expansion slot, wherein the expansion slot is connected to the system bus via an input/output channel controller, and wherein the special purpose processing element comprises an interrupt handler, an exception handler, and an address translator; and
    a memory coupled to the plurality of heterogeneous processing elements via a bus, the memory operable to store an operating system, wherein the operating system runs on the processor and wherein the operating system assigns an effective address range to the special purpose processing element, binds a process to the special purpose processing element, and initiates execution of the process on the special purpose processing element,
    wherein responsive to an interrupt for the special purpose processing element, the interrupt handler performs interrupt handling within the special purpose processing element;
    wherein responsive to an exception for the special purpose processing element, the exception handler performs exception processing within the special purpose processing element; and
    wherein responsive to the process accessing an effective address within the effective address range of the special purpose processing element, the address translator performs address translation within the special purpose processing element to access a real address in hardware.

9. The data processing system of claim 8, wherein the address translator comprises an effective to real address translation (ERAT) table.

10. The data processing system of claim 8, wherein the special purpose processing element adheres to a set of rules required for a processor.

11. The data processing system of claim 8, wherein the expansion slot is a peripheral component interconnect express (PCIe) expansion slot.

12. The data processing system of claim 8, wherein a peripheral device is connected to a second expansion slot and wherein the second expansion slot is connected to the system bus via the input/output channel controller.

13. The data processing system of claim 8, wherein the special purpose processing element is an input/output adapter.

14. The data processing system of claim 8, wherein the special purpose processing element is a security processor.

15. A computer program product comprising a non-transitory computer readable medium having a computer readable program, wherein the computer readable program, when executed on a computing device, causes the computing device to:
    assign, by an operating system executing on a processor of the computing device, an effective address range to a special purpose processing element within a plurality of heterogeneous processing elements, wherein the plurality of heterogeneous processing elements comprise the processor connected to a system bus via a processor slot and a special purpose processing element connected to an expansion slot, wherein the expansion slot is connected to the system bus via an input/output channel controller, and wherein the special purpose processing element comprises an interrupt handler, an exception handler, and an address translator;

bind, by the operating system, a process to the special purpose processing element; and initiate execution of the process on the special purpose processing element, wherein responsive to an interrupt for the special purpose processing element, the interrupt handler performs interrupt handling within the special purpose processing element;

wherein responsive to an exception for the special purpose processing element, the exception handler performs exception processing within the special purpose processing element; and wherein responsive to the process accessing an effective address within the effective address range of the special purpose processing element, the address translator performs address translation within the special purpose processing element to access a real address in hardware.

16. The computer program product of claim 15, wherein the special purpose processing element adheres to a set of rules required for a processor.

17. The computer program product of claim 15, wherein the expansion slot is a peripheral component interconnect express (PCIe) expansion slot.

18. The computer program product of claim 15, wherein a peripheral device is connected to a second expansion slot and wherein the second expansion slot is connected to the system bus via the input/output channel controller.

19. The computer program product of claim 15, wherein the special purpose processing element is an input/output adapter.

20. The computer program product of claim 15, wherein the special purpose processing element is a security processor.

* * * * *